US007791807B2

(12) United States Patent
Pasca et al.

(10) Patent No.: US 7,791,807 B2

(45) Date of Patent: Sep. 7, 2010

(54) AVOIDING INTERFERENCE ARTIFACTS IN A HEAD-UP DISPLAY OR A REFLECTED SEE-THROUGH TYPE DISPLAY

(75) Inventors: Eugenia Pasca, Woodinville, WA (US); Mark O. Freeman, Snohomish, WA (US)

(73) Assignee: Microvision, Inc., Redmond, WA (US)

(*) Notice: Subject to any disclaimer, the term of this patent is extended or adjusted under 35 U.S.C. 154(b) by 430 days.

(21) Appl. No.: 12/026,899

(22) Filed: Feb. 6, 2008

(65) Prior Publication Data

US 2009/0195875 A1 Aug. 6, 2009

(51) Int. Cl.
*G02B 27/14* (2006.01)

(52) U.S. Cl. .......................................... 359/630

(58) Field of Classification Search .......... 359/629–633
See application file for complete search history.

(56) References Cited

U.S. PATENT DOCUMENTS

| | | | | |
|---|---|---|---|---|
| 5,013,134 | A | 5/1991 | Smith | |
| 6,507,436 | B2 * | 1/2003 | Nishikawa et al. | 359/487 |
| 6,636,370 | B2 * | 10/2003 | Freeman | 359/894 |
| 7,158,095 | B2 * | 1/2007 | Jenson et al. | 345/7 |
| 7,400,448 | B2 * | 7/2008 | Hutchin | 359/494 |
| 2004/0265510 | A1 * | 12/2004 | Miroshin et al. | 428/1.31 |
| 2007/0086495 | A1 * | 4/2007 | Sprague et al. | 372/38.02 |
| 2007/0216836 | A1 * | 9/2007 | Lippey | 349/117 |

* cited by examiner

*Primary Examiner*—Scott J Sugarman
*Assistant Examiner*—Vipin M Patel
(74) *Attorney, Agent, or Firm*—Kevin D. Wills

(57) ABSTRACT

Briefly, in accordance with one or more embodiments, a birefringent layer may be utilized in conjunction with a head-up display (HUD) for a vehicle or the like, for example where the birefringent layer is disposed in or on the windshield. The birefringent layer may impart a change in the polarization of light emerging from a projector of the head-up display in order to reduce or minimize interference between beams from the display and reflecting off of two or more surfaces that are combined at the viewer's eye, and/or to reduce or minimize the effect of polarizing sunglasses on the viewability of the image projected by the display. In one or more embodiments, the birefringent layer alters the polarization of the light reaching the viewer's eye if the user is wearing polarizing glasses or lenses so that less light from the display is blocked.

21 Claims, 2 Drawing Sheets

Figure 1:
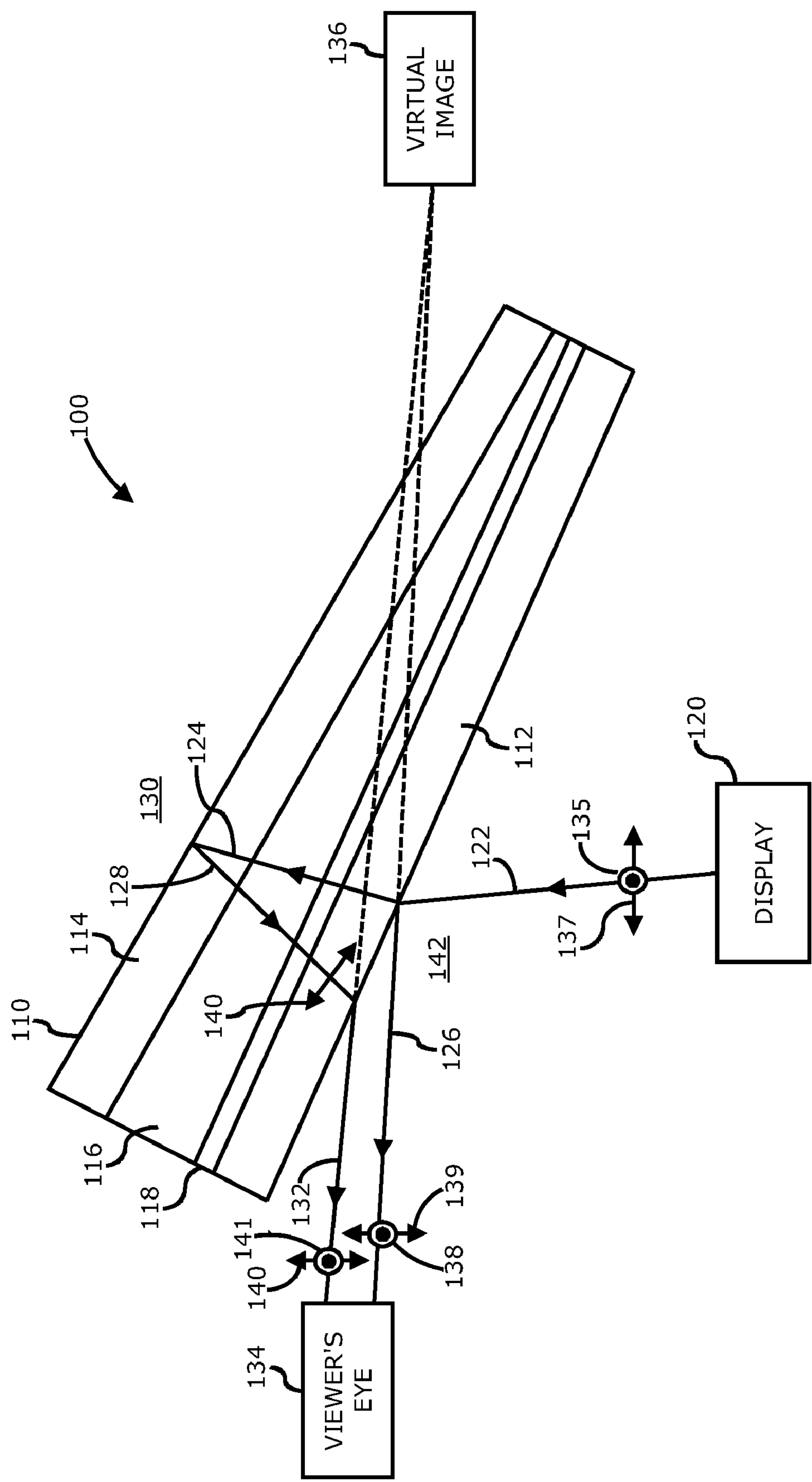

110 114 116 128 130 100 118 124 140 134 140 141 132 VIEWER'S EYE 136 VIRTUAL IMAGE 138 139 126 142 122 112 137 135 DISPLAY 120

AVOIDING INTERFERENCE ARTIFACTS IN A HEAD-UP DISPLAY OR A REFLECTED SEE-THROUGH TYPE DISPLAY

BACKGROUND

In a head-up display (HUD) system deployed in a vehicle or other application, light from a display is projected onto the windshield and reflected to the eye of the user to create a virtual image located at a given distance outside the windshield. Light incident on the windshield from the HUD projector may have an arbitrary polarization of any combination of the S polarization and/or P polarization relative to the windshield. Fresnel equations describe the reflection and transmission of electromagnetic waves at the interface of the windshield and the surrounding medium to arrive at the reflection and transmission coefficients for waves parallel to the plane of incidence as P polarized waves, and perpendicular to the plane of incidence as S polarized waves.

When polarizing sunglasses are worn while driving a vehicle, the reflected S polarized light from the windshield, which is also the horizontal polarized light relative to the earth, is blocked or at least partially blocked. For typical HUD displays, for example laser based displays, light emitting diode (LED) displays, liquid-crystal displays (LCD), and so on, the reflection from the windshield predominantly reflects horizontally polarized light into the eye box, and this light is also blocked or at least partially blocked by the polarizing sunglasses. Thus, the same reason that polarizing sunglasses are beneficial to the user in blocking light reflected off of ground surfaces outside the vehicle also prevents the user from properly viewing an image projected by a head-up display. Furthermore, where the HUD display is a laser based display, the first and second reflections of the emitted laser beams off the first surface and the second surface of the windshield may interfere since the first and second reflections may have the same or nearly the same polarization and since the laser beams comprise coherent light, thereby further impeding the proper viewing of the virtual image projected by the display.

DESCRIPTION OF THE DRAWING FIGURES

Figure 2:
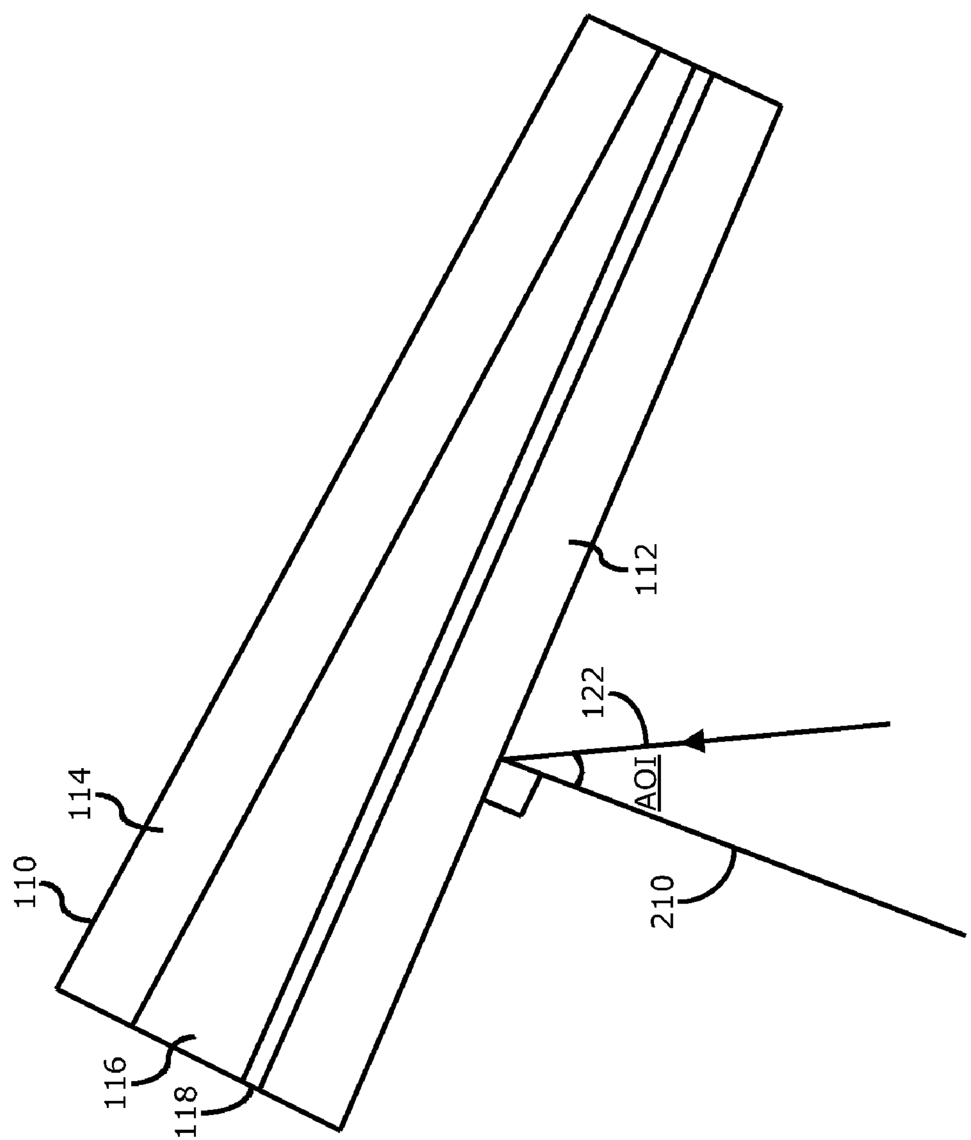

Claimed subject matter is particularly pointed out and distinctly claimed in the concluding portion of the specification. However, such subject matter may be understood by reference to the following detailed description when read with the accompanying drawings in which:

FIG. 1 is a diagram of a head-up display system including a windshield or the like having a birefringent layer in accordance with one or more embodiments; and FIG. 2 is a diagram of a windshield or the like having a birefringent layer illustrating an angle of incidence of randomly polarized light in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a head-up display system including a windshield or the like having a birefringent layer in accordance with one or more embodiments will be discussed. In one or more embodiments, head-up display (HUD) system 100 may be incorporated into a vehicle and/or may comprise a windshield 110 or the like comprising a first layer 112 and a second layer 114. It should be noted that windshield 110 is not necessarily shown to scale or proportion, and some dimensions of windshield 110 may be expanded relative to other dimensions for purposes of illustration and discussion. First layer 112 and/or second layer 114 may comprise glass or a plastic type material that is optically transparent, or partially transparent as dictated by the particular application and regulations or standards applied to that application, to function as a windshield. Furthermore, windshield 110 may comprise a wedge layer 116 disposed between first layer 112 and second layer 114 in order to ensure that first layer 112 is disposed at an offset angle with respect to second layer 114 as may be typically utilized in windshields designed for HUD systems. In one or more embodiments, wedge layer 116 may comprise polyvinyl butyral (PVB) or a polymer material or the like. The offset angle provided by wedge layer 116 may be about one-half to about one milliradian, as an example. The purpose of utilizing wedge layer 116 is to offset first layer 112 from second layer 114 at an offset angle in order to minimize or eliminate ghosting artifacts that may occur when windshield 110 is used as a reflector for HUD system 100, however the scope of the claimed subject matter is not limited in this respect.

In one or more embodiments, windshield 110 also comprises birefringent layer 118 in order to alter the polarization of light reflected off of windshield 110 so that HUD system 100 may be utilized by a user wearing polarizing sunglasses. Adding an appropriate birefringent layer 118 between first layer 112 and second layer 114 may reduce and/or eliminate artifacts caused by interference of laser light reflections from the front surface and back surfaces of windshield 110. Furthermore, birefringent layer 118 may be capable of increasing the visibility of virtual image 136 generated by display 120 even if the viewer is wearing polarized sunglasses, although the scope of the claimed subject matter is not limited in this respect.

In such embodiments, display 120 may project light 122 onto windshield 110, where the projected light 122 may include light having random polarization including S polarized light 135 and/or P polarized light 137 in any combination. At least a portion of the projected light beam 122 may be reflected by the interface between first layer 112 of windshield and ambient air 142, and redirected back to the viewer's eye 134 as beam 126. This reflected light beam 126 may create a virtual image 136 disposed on the opposite side of windshield 110 corresponding to an image projected by display 120 via projected light beam 122. However, based on the coefficients of Fresnel equations, this reflected light beam 126 may contain light that is predominantly S polarized 138, but which may also at least partially comprise a P polarized light component 139, so that if the viewer were wearing polarizing sunglasses, most of the reflected light 126 would be blocked by the polarizing sunglasses, and thereby making it difficult or impossible for the viewer to properly view virtual image 136 generated by display 120.

In one or more embodiments, a portion of the projected light beam 122 may be transmitted past the interface between first layer 112 and medium 142 as transmitted light beam 124 to be reflected off of the interface between second layer 114 and the medium 130 disposed on the opposite side of windshield from display 120. Based on the coefficients of Fresnel equations transmitted light beam 124 may contain both S and P polarizations depending on the polarization of the input beam 122 where the proportion of light in the S polarization state has been reduced by a greater amount than the proportion of the P polarization by Fresnel reflection at the first windshield surface between medium 142 and medium 112. Since transmitted light beam 124 passes through birefringent layer 118, birefringent layer 118 may impart a change in the polarization of the transmitted beam 124 that passes through birefringent layer 118, thereby redistributing the amount of light that is P polarized 140 versus the amount of light that is S polarized 138. However, transmitted beam 124 will reflect off of the interface between second layer 114 and medium 130 as reflected beam 128 having light that is predominantly S polarized 138. When reflected beam 128 passes back through birefringent layer 118, birefringent layer 118 will again impart a change in the polarization of the light of reflected beam 128, redistributing the amount of light that is S polarized 138 versus the amount of light that is P polarized 140, thereby increasing the P polarization component 140 after exiting birefringent layer 118. This P polarized 140 light beam 128 will be refracted by the interface between first layer 112 and medium 142 back toward the viewer's eye 134 as beam 132 having light with a greater proportion of P polarization 140 than would be present without birefringent layer 118, which also may at least partially contain an S polarized component 141. This P polarized 140 beam 132 may not be significantly blocked by polarizing sunglasses worn by the viewer so that the viewer may be able to properly view the virtual image 136 resulting from beam 132.

In one or more embodiments, birefringent layer 118 may comprise a birefringent material suitable to impart a change in the polarization of the light of beam 122 as described herein, above. For example, birefringent layer 118 may comprise a polymer wave retarder, a cellophane material, a birefringent crystal material such as calcite or a quartz material fashioned to function as a wave retarder, mica, a sheet-type polarizer having organic materials embedded to provide birefringence, a dielectric thin film polarizer, a metallic thin film polarizer, and so on. In one or more embodiments, birefringent layer 118 may be a layer added to windshield 110 in addition to first layer 112, second layer 114, and wedge layer 116. In one or more alternative embodiments, wedge layer 116 may be imparted with birefringent properties such that wedge layer 116 and birefringent layer 118 comprise the same layer. For example, if wedge layer 116 comprises a polymer, the molecules of the polymer may be stretched during formation of wedge layer 116 to impart a desired amount of birefringence to wedge layer 116 so that wedge layer 116 may be capable of providing the function of birefringent layer 118. Likewise, one or more of first layer 112 and/or second layer 114 may comprise a material fashioned to have birefringent properties so that first layer 112 and/or second layer 114 may be capable of providing the function of birefringent layer 118. This may occur, for example, where windshield 110 comprises a plastic or polymer material instead of glass according to the intended use or application of windshield 110. Furthermore, birefringent layer 118 may be added to windshield 110 after the manufacture of windshield 110 and/or after installation of windshield 110 in a vehicle or other application. Such a post manufacture, or aftermarket, application of birefringent layer 118 to windshield 110 may be accomplished where birefringent layer 118 comprises a sheet or film applied to windshield 110 via an adhesive. Furthermore, in some embodiments, birefringent layer 118 may comprise a separate pane (not shown) disposed adjacent to windshield 110 but not necessarily being a component of or adhered to windshield 110. Such a pane of birefringent material may be affixed to the dashboard of the vehicle in the eye box region of HUD system 100, for example in the path of beam 126 and/or beam 132.

Referring now to FIG. 2, a diagram of a windshield or the like having a birefringent layer illustrating an angle of incidence of randomly polarized light in accordance with one or more embodiments will be discussed. Windshield 110 as shown in FIG. 2 is substantially the same windshield as shown in FIG. 1, and may include a first transparent layer 112, second transparent layer 114, wedge layer 116, and birefringent layer 118. In order to determine the amount of change imparted to the polarization of a given beam of light by birefringent layer 118, an analysis was performed based on incident beam 122 on windshield 110 at predetermined angle, referred to as the angle of incidence (AOI) measured from a normal line 210 with respect to the interface being analyzed (the figure shows the AOI for the incident beam 122 at the interface between medium 142 and first layer 112.

Using the Fresnel equations and polarization analysis for a known AOI and index of refraction for the materials, and where beam 122 comprises a red laser have a wavelength, $\lambda$, of 639 nm, the intensity for the reflected beams from the front surface of first layer 112, and back surface of second layer 114 of windshield 110 was determined. Furthermore, the interference was minimized by varying the retardance, $\Gamma$, and the principal axis angle of birefringent layer 118. The retardance is the net phase shift integrated along the path of the light through windshield 110 and is expressed in degrees in a range from 0 degrees to 180 degrees. The principal axis angle was varied from 0 degrees to 90 degrees from horizontal.

Light beam 122 incident on windshield 110 from display 120 may have an arbitrary polarization, which may comprise any combination of the S polarization 135 and/or P polarization 137 relative to windshield 110. The Fresnel equations describe the reflection and transmission of electromagnetic waves at interface to provide the reflection and transmission coefficients for waves parallel, P polarized 137, and perpendicular, S polarized 135, to the plane of incidence on windshield 110.

Based on the coefficients of the Fresnel equations, the S polarized light 135 is more strongly reflected at about 26% of the energy of light beam 122, while the P polarized light 137 is mostly transmitted and having about 2-3% reflection of the energy of light beam 122. An incoming beam corresponding to light beam 124 traversing birefringent layer 118 for the first time causes the power distribution between S polarized light 138 and P polarized light 140 to be redistributed. At the second surface of windshield at second layer 114, the S-polarized light 128 is predominantly reflected again. Passing through birefringent layer 118 for the second time, the relative intensities in S polarized light 138 and P polarized light 140 get redistributed for a second time.

When the input light beam 122 is predominantly S polarized light 135, the light is strongly reflected. For an AOI of about 66 degrees to about 70 degrees, n1=1 for air and n2=1.51 for glass where first layer 112 and second layer 114 comprise glass, the intensity of the light reflected from the surface of first layer 112 is in the range of about 24.4% to about 30% of the predominantly S polarized light 135 of light beam 122. For angles of incidence in the range of about 66 degrees to about 70 degrees, only about 70% to about 75.6% of the S polarized light 135 of input light beam 122 is transmitted through first layer 112 of windshield 110, which in turn passes through birefringent layer 118, then is reflected at the glass-air interface formed by second layer 114 and air medium 130, which in turn passes through birefringent layer 118 for a second time, and then is transmitted through the glass-air interface comprising first layer 112 and air medium 142 and on to the viewer's eye 134 as exiting light beam 132. The intensity of light beam 132 depends on the retardance, $\Gamma$, birefringent layer 118, and the angle of rotation, $\beta$, relative to the optical axis imparted by birefringent layer 118 with respect to the horizon.

The total intensity of light that gets to the viewer's eye 134 is the sum of the intensities of the light reflected from the surface of first layer 112, represented as light beam 126, and the above described exiting light beam 132. In order to minimize interference, light beam 132 and light beam 126 should be sufficiently orthogonal. To find a maximum intensity and a minimum interference by the combination of light beam 132 with light beam 126, intensity of light at the viewer's eye 134 and the Michelson contrast for the interference of light beam 126 and light beam 132 may be determined as a function of the retardance, $\Gamma$, and angle of rotation, $\beta$, for each fraction, a, of the input light in the S polarization state 138.

For a=1 being all S polarized light 135 at input light beam 122, the intensity of light that gets to the viewer's eye 134 was determined and was found to vary with the retardance $\Gamma$ and the angle of rotation $\beta$ of birefringent layer 118. For a retardance of $\Gamma$=180 degrees and angle of rotation of $\beta$=30.5 degrees or 59.5 degrees, the contrast of the interference is zero and the intensity of the light represents about 32.82% of the intensity of the S polarized light 135 of input beam 122. For a=0 comprising all P polarized light 137 at input light beam 122, the intensity of light that gets to the viewer's eye 134 was determined and was found to vary with the retardance $\Gamma$ and the angle of rotation $\beta$ of birefringent layer 118. For a retardance of $\Gamma$=180 degrees and $\beta$=14.5 degrees or 75.5 degrees, the contrast of the interference is zero and the intensity of the light is smaller, representing about 8% of the intensity of the P polarized light 137 of input light beam 122. A maximum interference corresponds to a retardance $\Gamma$=180 deg and $\beta$=45 degrees, which will result in a higher contrast of the interference of about 58%, which generally may not be desirable.

Without utilizing birefringent layer 118 with windshield 110, for an angle of incidence of about 67.8 degrees, the intensity of light reaching the viewer's eye 134 may be examined. Table 1 illustrates distribution of the light intensity as a percentage of the intensity of the input light beam 122.

TABLE 1

| Input Polarized Light | Intensity at 1st surface | Intensity at 2nd surface | Intensity at viewer's eye | Michelson Contrast of the Interference |
|---|---|---|---|---|
| S | 26.9% | 14.4% | 41.3% | 95.27% |
| P | 2.6% | 2.4% | 5.0% | 99.96% |

When polarizing sunglasses are worn by the viewer, only about 5% of the intensity of the light from input beam 122 reaches the viewer's eye 134 and comprises predominantly P polarized light 140, whereas about 41.3% of the S polarized light 135 of input light beam 122 will be blocked. The Michelson contrast of the interference for both cases may be high if birefringent layer 118 is not used.

Table 2, below, represents the results of using birefringent layer 118 disposed at various angles of rotations to determine the intensities of the light beams and the resulting interference indicated by Michelson Contrast of the interference. In particular, the, upper portion of Table 2 represents values when the Michelson Contrast of the interference was held to a minimum value. When birefringent layer 118 is utilized, it was determined that when input light beam 122 comprises all or nearly all S polarized light 122, intensity of light at the viewer's eye 134 can be maximized or nearly maximized. To get a minimum contrast of interference, birefringent layer 118 comprising a material having a retardance of $\Gamma$=180 degrees, a half wave retarder, was placed between first layer 112 and second layer 114 and rotated at about 30.5 degrees or about 59.5 degrees about the optical axis of with respect to horizontal. For a minimum or zero value of the interference created from the combination of light beam 126 and light beam 132, a maximum intensity of light at the viewer's eye 134 represents about 32.82% of the total intensity of the S polarized light 135 of input light beam 122. From this 32.82% intensity at the viewer's eye 124, about 26.92% comprises the intensity of reflected S polarized light 135 and about 5.9% comprises the intensity of reflected P polarized light 137. As the fraction of S polarized light 135 of input light beam 122 light increases from 0 to 1, the intensity of light at the viewer's eye 134 increases. Furthermore, as light beam 132 comprises predominantly P polarized light 140, which is achieved via birefringent layer 118, and as light beam 126 comprises predominantly S polarized light 138, the orthogonality of the polarization of light beam 122 with respect to light beam 132 may reduce or eliminate interference between light beam 122 and 132 where the beams comprise laser light emitted from display 120.

TABLE 2

| Fraction of the input light in S polarization state a | Parameters of the birefringent layer | | 1st surface reflection | | | 2nd surface reflection | | | Intensity at eye | | | Ratio of intensity of P polariz state to total Intensity eye | Michelson Contrast of the Interference |
|---|---|---|---|---|---|---|---|---|---|---|---|---|---|
| | Retardance Γ | Angle of rotation β | Intensity of S | Intensity of P | Intensity at 1st surface | Intensity of S | Intensity of P | Intensity at 2nd surface | Intensity of S at eye | Intensity of P at eye | Total Intensity at eye | | |
| 0 (P only) | 180 | 14.5 | 0 | 2.6 | 2.6 | 5.9 | 0 | 5.9 | 5.9 | 2.6 | 8.9 | 30.50 | 0 |
| 0.1 | 180 | 18 | 0.27 | 2.1 | 2.37 | 7.1 | 0.84 | 7.94 | 7.37 | 2.94 | 10.3 | 28.52 | 0 |
| 0.2 | 180 | 22.9 | 1.1 | 1.6 | 2.7 | 6.4 | 4.2 | 10.6 | 7.5 | 5.8 | 13.3 | 43.61 | 0 |
| 0.3 | 180 | 27.4 | 2.4 | 1.3 | 3.7 | 4.1 | 7.9 | 12 | 6.5 | 9.2 | 15.7 | 58.60 | 0 |
| 0.4 | 180 | 30.6 | 4.3 | 0.9 | 5.2 | 2.1 | 9.4 | 11.5 | 6.4 | 10.3 | 16.7 | 61.97 | 0 |
| 0.5 | 180 | 32.5 | 6.73 | 0.65 | 7.38 | 0.91 | 9.2 | 10.1 | 7.64 | 9.85 | 17.5 | 56.32 | 0 |
| 0.6 | 180 | 33.4 | 9.7 | 0.4 | 10.1 | 0.4 | 8.16 | 8.56 | 10.1 | 8.56 | 18.7 | 46.00 | 0 |
| 0.7 | 180 | 33.29 | 13.2 | 0.2 | 13.4 | 0.12 | 7.1 | 7.22 | 13.3 | 7.3 | 20.6 | 35.55 | 0 |
| 0.8 | 180 | 32.6 | 17.3 | 0.1 | 17.4 | 0 | 6.4 | 6.4 | 17.3 | 6.5 | 23.8 | 27.28 | 0 |
| 0.9 | 180 | 31.55 | 21.8 | 0 | 21.8 | 0 | 6 | 6 | 21.8 | 6 | 27.8 | 21.69 | 0 |
| 1 (S only) | 180 | 30.45 | 26.9 | 0 | 26.9 | 0 | 5.9 | 5.9 | 26.9 | 5.9 | 32.8 | 18.08 | 0 |
| 0 | 180 | 45 | 0 | 2.6 | 2.6 | 0 | 25.5 | 25.5 | 0 | 25.5 | 28.1 | 100.00 | 57.8 |
| 0.1 | 180 | 44 | 0.26 | 2.1 | 2.36 | 0 | 20.8 | 20.8 | 0.26 | 22.9 | 23.2 | 98.80 | 56 |
| 0.2 | 180 | 42 | 1.07 | 1.67 | 2.74 | 0 | 16.9 | 16.9 | 1.07 | 18.6 | 19.6 | 94.00 | 51 |
| 0.3 | 180 | 40 | 2.4 | 1.3 | 3.7 | 0.14 | 13.6 | 13.7 | 2.54 | 14.9 | 17.4 | 85.31 | 41 |
| 0.4 | 180 | 36 | 4.3 | 0.93 | 5.33 | 0.53 | 11.1 | 11.6 | 4.83 | 12 | 16.8 | 71.26 | 20 |
| 0.8 | 180 | 25 | 17.2 | 0.1 | 17.3 | 1.6 | 7.4 | 9 | 18.8 | 7.5 | 26.3 | 28.50 | 33 |
| 0.9 | 180 | 25 | 21 | 0 | 21 | 1.1 | 7.7 | 8.8 | 22.1 | 7.7 | 29.8 | 25.00 | 30 |
| 1 | 180 | 23 | 26.9 | 0 | 26.9 | 1.5 | 8.2 | 9.7 | 28.4 | 8.2 | 36.8 | 23.00 | 35 |

To accommodate the user wearing polarizing sunglasses, a maximum intensity for the amount of P polarized light 140 that transmits through the polarizing sunglasses into the viewer's eye 134 may be determined. To solve this polarized sunglasses problem, in one or more embodiments less weight may be placed on the Michelson contrast of the interference and more weight placed on the total intensity of light reaching the viewer's eye 134 and also on the ratio of intensity of the P polarized light 140 to the total intensity of light reaching the viewer's eye. This situation is illustrated in the lower half of Table 2. It was determined that birefringent layer 118 could comprise a birefringent material having a retardance of Γ=180 degrees disposed between first layer 112 and second layer 114 of windshield 114, and having an angle of rotation of β=23 degrees about the optical axis. Such an embodiment of birefringent layer 118 may achieve a relatively higher intensity at the viewer's eye 134 of about 36.62%, and also a considerable amount of light, about 8.2%, in the P polarization state 140, and with a Michelson contrast of the interference of about 35%. It should be noted that this is merely one embodiment for an example windshield 110 having a birefringent layer 118 for use in a HUD system or the like having a display 120 emitting a light beam 122 at a given AOI about 66 degrees to about 70 degrees, and so on, and that other combinations of such values for birefringent layer and/or display 120 of the HUD system, and the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to avoiding interference artifacts in a head-up display or a reflected see-through type display and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A windshield for a head-up display, the windshield comprising:

a first layer of transparent or partially transparent material;

a second layer of transparent or partially transparent material; and a birefringent layer disposed in the windshield, the birefringent layer being capable of imparting a change in the polarization of light emerging from a projector of the head-up display, wherein the birefringent layer comprises a birefringent material having a retardance of about 180 degrees, and is disposed at an angle of rotation of about 23 degrees about an optical axis with respect to horizontal.

2. A windshield as claimed in claim 1, further comprising:

a wedge layer disposed between the first layer of transparent material and the second layer of transparent material, the wedge layer generally imparting an offset angle between the first layer of transparent material and the second layer of transparent material to reduce or eliminate a ghosting effect.

3. A windshield as claimed in claim 2, wherein the birefringent layer is a separate layer from the wedge layer.

4. A windshield as claimed in claim 2, wherein the birefringent layer is not a separate layer from the wedge layer.

5. A windshield as claimed in claim 2, wherein the birefringent layer is at least partially embodied by the wedge layer by imparting birefringence to the wedge layer.

6. A windshield as claimed in claim 1, wherein the change in polarization imparted by the birefringent layer is selected to increase an intensity of light at an eye of a viewer if the viewer is wearing polarizing sunglasses, while not significantly decreasing an intensity of light at the eye of the viewer corresponding to an image projected by the display.

7. A windshield as claimed in claim 1, wherein the birefringent layer is capable of reducing or eliminating interference at the eye of the viewer, the interference being between light emerging from the projector that is reflected from the first layer of transparent material and light that is reflected from the second layer of transparent material.

8. A windshield as claimed in claim 1, wherein the birefringent layer comprises a polymer wave retarder, a cellophane material, a birefringent crystal material such as calcite or a quartz material fashioned to function as a wave retarder, mica, a sheet-type polarizer having organic materials embedded to provide birefringence, a dielectric thin film polarizer, a metallic thin film polarizer, or combinations thereof.

9. A head-up display system for a vehicle, comprising:

a display comprising a scanned-beam display capable of projecting an image viewable by viewer with a beam of light emerging from the display; and a windshield capable of at least partially reflecting beam of light emerging from the display to an eye of the viewer, the windshield comprising:

a first layer of transparent material;

a second layer of transparent material; and a birefringent layer, the birefringent layer being capable of imparting a change in the polarization of light emanating from a display of the head-up display, wherein the birefringent layer comprises a birefringent material having a retardance of about 180 degrees, and is disposed at an angle of rotation of about 23 degrees about an optical axis with respect to horizontal.

10. A head-up display system as claimed in claim 9, further comprising:

a wedge layer disposed between the first layer of transparent material and the second layer of transparent material, the wedge layer generally imparting an offset angle between the first layer of transparent material and the second layer of transparent material to reduce or eliminate a ghosting effect.

11. A head-up display system as claimed in claim 10, wherein the birefringent layer is a separate layer from the wedge layer.

12. A head-up display system as claimed in claim 10, wherein the birefringent layer is not a separate layer from the wedge layer.

13. A head-up display system as claimed in claim 10, wherein the birefringent layer is at least partially embodied by the wedge layer by imparting birefringence to the wedge layer.

14. A head-up display system as claimed in claim 9, wherein the change in polarization imparted by the birefringent layer is selected to increase an intensity of light at an eye of a viewer if the viewer is wearing polarizing sunglasses, while not significantly decreasing an intensity of light at the eye of the viewer corresponding to an image projected by the display.

15. A head-up display system as claimed in claim 9, wherein the birefringent layer is capable of reducing or eliminating interference at the eye of the viewer, the interference being between light emanating from the display that is reflected from the first layer of transparent material and light that is reflected from the second layer of transparent material.

16. A head-up display system as claimed in claim 9, wherein the birefringent layer comprises a polymer wave retarder, a cellophane material, a birefringent crystal material such as calcite or a quartz material fashioned to function as a wave retarder, mica, a sheet-type polarizer having organic materials embedded to provide birefringence, a dielectric thin film polarizer, a metallic thin film polarizer, or combinations thereof.

17. A head-up display system as claimed in claim 9, wherein the birefringent layer is disposed within the windshield, on a surface of the windshield, proximate to the windshield, within a numerical aperture expander, on a numerical aperture expander, proximate to an exit aperture of the display, in a polarizing sunglasses, or on polarizing sunglasses, or combinations thereof.

18. A vehicle, comprising:

a head-up display system comprising a laser based scanned beam display capable of projecting a virtual image visible to a viewer in the vehicle; and a windshield capable of reflecting light emanating from the laser based scanned beam display, the windshield comprising:

a first layer of transparent material;

a second layer of transparent material; and a birefringent layer disposed in the windshield, the birefringent layer being capable of imparting a change in the polarization of light emanating from the laser based scanned beam display, wherein the birefringent layer comprises a birefringent material having a retardance of about 180 degrees, and is disposed at an angle of rotation of about 23 degrees about an optical axis with respect to horizontal.

19. A vehicle as claimed in claim 18, further comprising:

a wedge layer disposed between the first layer of transparent material and the second layer of transparent material, the wedge layer generally imparting an offset angle between the first layer of transparent material and the second layer of transparent material to reduce or eliminate a ghosting effect.

20. A vehicle as claimed in claim 18, wherein the change in polarization imparted by the birefringent layer is selected to increase an intensity of light at an eye of a viewer if the viewer is wearing polarizing sunglasses, while not significantly decreasing an intensity of light at the eye of the viewer corresponding to an image projected by the display.

21. A vehicle as claimed in claim 18, wherein the birefringent layer is capable of reducing or eliminating interference at the eye of the viewer, the interference being between light emanating from the display that is reflected from the first layer of transparent material and light that is reflected from the second layer of transparent material.

* * * * *